(12) United States Patent
Matsufuji et al.

(10) Patent No.: US 9,586,502 B2
(45) Date of Patent: Mar. 7, 2017

(54) SEAT APPARATUS

(71) Applicant: AISIN SEIKI KABUSHIKI KAISHA, Kariya-shi (JP)

(72) Inventors: Tomio Matsufuji, Kariya (JP); Takashi Hattori, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 67 days.

(21) Appl. No.: 14/630,154

(22) Filed: Feb. 24, 2015

(65) Prior Publication Data

US 2015/0274037 A1 Oct. 1, 2015

(30) Foreign Application Priority Data

Mar. 25, 2014 (JP) ................................. 2014-061834

(51) Int. Cl.
  *B60N 2/12* (2006.01)
  *B60N 2/20* (2006.01)
  *B60N 2/225* (2006.01)

(52) U.S. Cl.
  CPC ................ *B60N 2/12* (2013.01); *B60N 2/20* (2013.01); *B60N 2/2252* (2013.01)

(58) Field of Classification Search
  CPC ........... B60N 2/12; B60N 2/20; B60N 2/2252
  USPC ......................................... 297/378.1, 378.12
  See application file for complete search history.

(56) References Cited

U.S. PATENT DOCUMENTS

| | | | |
|---|---|---|---|
| 6,336,679 B1 * | 1/2002 | Smuk ....................... | B60N 2/12 297/378.12 |
| 7,017,993 B2 | 3/2006 | Niimi et al. | |
| 7,857,392 B2 * | 12/2010 | Hayakawa ............... | B60N 2/12 297/378.12 |
| 8,424,970 B2 | 4/2013 | Ito | |
| 8,985,691 B2 * | 3/2015 | Tsuruta .................... | B60N 2/12 297/378.12 |
| 2004/0021355 A1 * | 2/2004 | Ohba ........................... | 297/341 |
| 2006/0055223 A1 * | 3/2006 | Thiel ....................... | B60N 2/22 297/378.12 |
| 2010/0171351 A1 | 7/2010 | Thiel et al. | |

FOREIGN PATENT DOCUMENTS

| | | |
|---|---|---|
| DE | 100 12 009 A1 | 9/2001 |
| JP | 2003 182415 | 7/2003 |
| JP | 2009 82241 | 4/2009 |
| WO | WO 2007/087876 A1 | 8/2007 |

OTHER PUBLICATIONS

Extended European Search Report issued Jul. 24, 2015 in Patent Application No. 15159876.0.

* cited by examiner

*Primary Examiner* — Anthony D Barfield
(74) *Attorney, Agent, or Firm* — Oblon, McClelland, Maier & Neustadt, L.L.P.

(57) ABSTRACT

A seat apparatus includes a lower arm including one of an internal gear and an external gear, an upper arm including the other of the internal gear and the external gear, a lock member restricting and allowing a movement of a seat; a lever being rotatably connected to the lower arm, the lever being linked with an operation of the lock member to restrict the movement; and a transmission portion disposed between the lower arm and the upper arm, the transmission portion transmitting a rotation of the upper arm which corresponds to a forward inclination of a seatback to the lever by absorbing an eccentricity of the internal gear and the external gear.

3 Claims, 3 Drawing Sheets

SEAT APPARATUS

CROSS REFERENCE TO RELATED APPLICATIONS

This application is based on and claims priority under 35 U.S.C. §119 to Japanese Patent Application 2014-061834, filed on Mar. 25, 2014, the entire content of which is incorporated herein by reference.

TECHNICAL FIELD

This disclosure generally relates to a seat apparatus.

BACKGROUND DISCUSSION

A known seat apparatus is disclosed in JP2003-182415A (hereinafter referred to as Patent reference 1). According to Patent reference 1, the seat apparatus includes a lower arm which is provided at a seat cushion and an upper arm which is provided at a seatback. Because the upper arm is pivotally connected to the lower arm via a pin, the upper arm pivots in a front-rear direction via the pin. A pivot member is fixed to the upper arm so as to integrally pivotally move therewith. A first link is pivotally connected to the lower arm via the pin. A first end of the first link is attached with a contact pin. A second end of the first link is linked with a lock member which selectively restricts the movement of a seat in the front-rear direction. The contact pin is disposed on a pivot trajectory of the pivot member when the upper arm pivots forward. Thus, when the seatback moves from an occupied state to a forward-inclined state (hereinafter referred to as forward inclination), the lock member allows the movement of the seat in the front-rear direction because the first link is pressed by the pivot member and pivots. Accordingly, the seat moves in the front-rear direction in connection with the forward inclination of the seatback.

A seat reclining apparatus is disclosed in JP2009-82241A (hereinafter referred to as Patent reference 2). The seat reclining apparatus includes a lower arm and an upper arm. Respective pivot centers of the lower arm and the upper arm are eccentric from each other to adjust and hold an inclination angle of a seatback relative to a seat cushion. In particular, the seat reclining apparatus is provided with, for example, an internal gear, an external gear, a wedge member and a cam shaft. The internal gear is formed at the lower arm. The external gear includes teeth fewer than the teeth of the internal gear and is formed at the upper arm. The wedge member holds the internal gear and the external gear eccentrically to engage the internal gear with the external gear. The cam shaft is disposed coaxially with the lower arm (internal gear) and axially supports the upper arm. The cam shaft moves the wedge member. By the movement of the wedge member in response to the rotation of the cam shaft, the upper arm revolves while the wedge member holds the internal gear and the external gear meshed with each other to decrease the rotary speed of the cam shaft which corresponds to the rotation of the upper arm during the revolving. Then the seatback pivots (is inclined) relative to the seat cushion by the rotation of the upper arm relative to the lower arm.

In a case where the seat apparatus includes a structure in which the pivot centers of the lower arm and the upper arm are eccentric from each other, when the seat back is inclined forward, the pivot member presses the first link (the contact pin) in a state where the upper arm is eccentric from the lower arm. Accordingly, the lock member which is linked with the first link does not securely allow the movement of the seat.

A need thus exists for a seat apparatus which is not susceptible to the drawback mentioned above.

SUMMARY

According to an aspect of this disclosure, a seat apparatus includes a seat, a seat cushion of the seat, a seatback of the seat, a lower arm being fixed to the seat cushion, the lower arm including one of an internal gear and an external gear which includes teeth fewer than teeth of the internal gear, the external gear eccentrically meshing with the internal gear, an upper arm being fixed to the seatback, the upper arm including the other of the internal gear and the external gear, a lock member being supported at the seat cushion, the lock member restricting and allowing a movement of the seat, a lever being coaxially disposed with one of the internal gear and the external gear provided at the lower arm, the lever being rotatably connected to the lower arm, the lever being linked with an operation of the lock member to restrict the movement, and a transmission portion disposed between the lower arm and the upper arm, the transmission portion transmitting a rotation of the upper arm which corresponds to a forward inclination of the seatback to the lever by absorbing an eccentricity of the internal gear and the external gear.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1A:
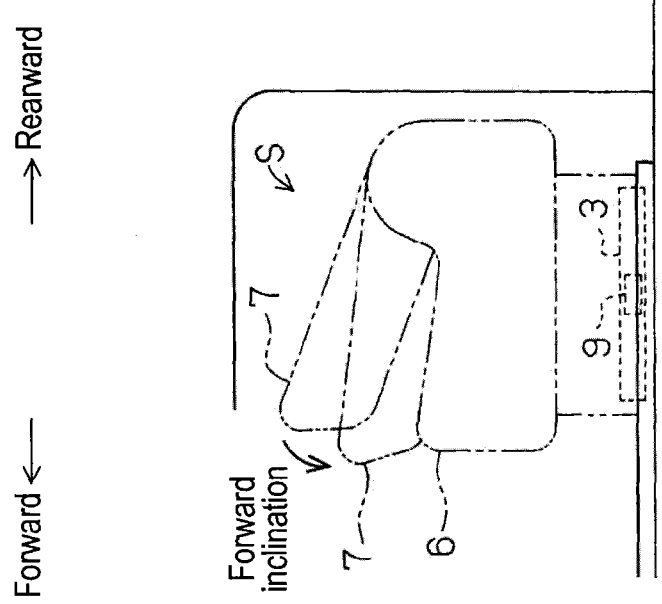
FIG. 1A is a side view of a seat in a case where the seat is in a forward-inclined state according to first and second embodiments disclosed here.
Figure 1B:
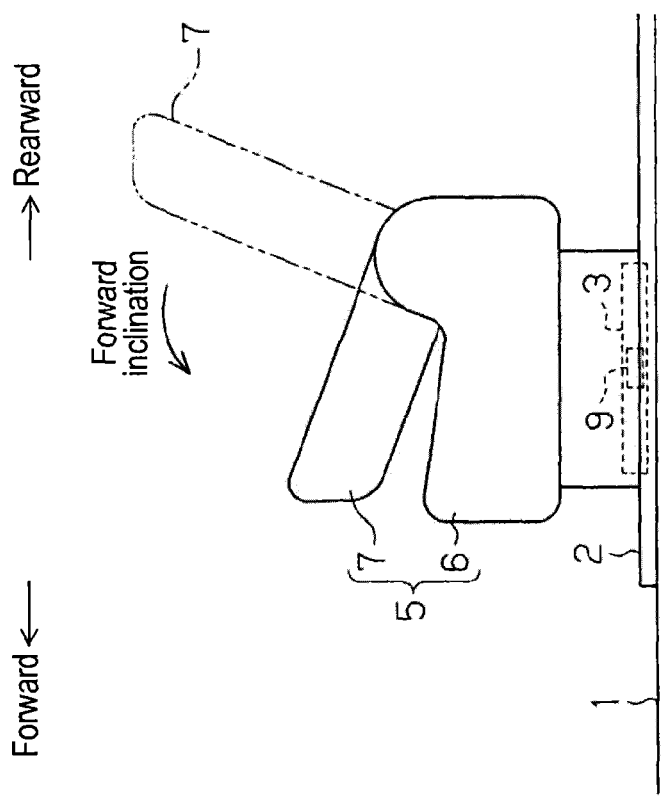
FIG. 1B is a side view of the seat in a case where the seat is in the further forward-inclined state from the state in FIG. 1A according to the first and second embodiments.

A seat apparatus of first and second embodiments will be explained with reference to the drawings. Hereinafter, a front-rear direction of a seat is referred to as a front-rear direction. A width direction of the seat is referred to as a width direction. As shown in FIG. 1A, a lower rail 2 extending in a front-rear direction is fixed to a floor 1 of a vehicle. An upper rail 3 is relatively movably mounted to the lower rail 2 to be movable in the front-rear direction. The lower rail 2 is provided in a pair and is disposed away from each other in the width direction. The upper rail 3 is provided in a pair and is disposed away from each other in the width direction. Each of FIGS. 1A and 1B shows the lower rail 2 and the upper rail 3 which are positioned on the left in a forward moving direction. A seat 5 which corresponds to a seating portion of a passenger is fixed and supported by the upper rails 3. The seat 5 includes a seat cushion 6 and a seatback 7. The seat cushion 6 corresponds to a seat. The seatback 7 is inclinedly or tiltedly supported relative to a rear end portion of the seat cushion 6. That is, the seat back 7 is supported relative to the rear end portion of the seat cushion 6 so as to pivot relative to the rear end portion. Accordingly, the seatback 7 is inclined forward and rearward relative to the seat cushion 6.

The upper rail 3 supports a lock member 9 which selectively engages with the lower rail 2. The lock member 9 is biased by an appropriate biasing member to be engaged with the lower rail 2. Basically, the lock member 9 restricts the relative movement of the lower rail 2 and the upper rail 3, that is, the movement of the seat 5 in the front-rear direction. The lock member 9 is linked with the seatback 7 and is disengaged from the lower rail 2 against the biasing force of the biasing member in response to, for example, a forward inclination or a forward tilt or a leaned forward of the seatback 7. Accordingly, the lock member 9 allows the relative movement of the lower rail 2 and the upper rail 3, that is, the movement of the seat 5 in the front-rear direction.

The vehicle is provided with a retracting space S which is disposed at a rear of the lower rail 2. The retracting space S is provided to store the retracted seat 5 which moves rearward along the lower rail 2 while the seatback 7 is in the forward-inclined state or the forward tilting state.

Figure 2A:
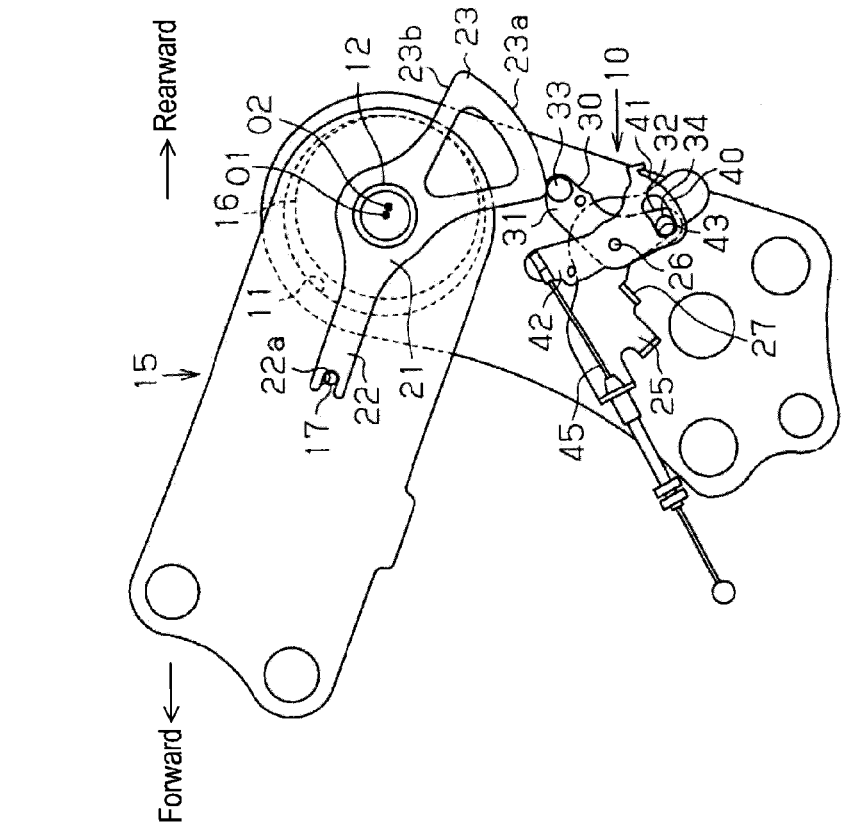
FIG. 2A is a side view of a seat apparatus in a case where the seat is in an occupied state according to the first embodiment.

Next, the connection structure between the seat cushion 6 and the seatback 7 will be explained. As shown in FIG. 2A, the seat cushion 6 is fixed with a lower arm 10 which is made from, for example, metal plate. The seatback 7 is fixed with an upper arm 15 which is made from, for example, metal plate. An upper end portion of the lower arm 10 and a lower end portion of the upper arm 15 are disposed overlappingly with each other in the width direction. The overlapped portions of the lower arm 10 and the upper arm 15 are provided with an internal gear 11 and an external gear 16, respectively. The internal gear 11 is formed in a bottomed, substantially cylindrical shape and is recessed in the width direction from a surface of the lower arm 10 which opposes the upper arm 15. The external gear 16 is formed in a substantial columnar shape and protrudes toward the lower arm 10 in the width direction to be housed in the internal gear 11. The internal gear 11 and the external gear 16 are meshed with each other eccentrically. Respective centers of the internal gear 11 and the external gear 16 are referred to as a first center O1 and a second center O2. Teeth of the external gear 16 are set to be fewer than teeth of the internal gear 11. A known hypocycloid reduction gear is configured with the internal gear 11, the external gear 16, a wedge member and a cam shaft. Because the wedge member holds the internal gear 11 and the external gear 16 eccentrically, the internal gear 11 and the external gear 16 mesh with each other. The cam shaft is disposed coaxially with the internal gear 11 and axially supports the upper arm 15. The cam shaft moves the wedge member.

The cam shaft is connected to output shafts of an appropriate operation handle or an appropriate electric motor and integrally rotates with the operation handle or the electric motor in response to the rotation of the output shafts. By the movement of the wedge member in response to the rotation of the cam shaft, the upper arm 15 revolves while the wedge member holds the internal gear 11 and the external gear 16 to be meshed with each other to decrease the rotary speed of the cam shaft which corresponds to the rotation of the upper arm 15 during the revolving. In other words, the upper arm 15 rotates relative to the lower arm 10 in accordance with the difference of the respective numbers of the teeth of internal gear 11 and the external gear 16. Because the upper arm 15 rotates relative to the lower arm 10, the seatback 7 rotates (is inclined or tilted) relative to the seat cushion 6.

The lower arm 10 is provided with a substantially-cylindrical bearing portion 12 which is disposed coaxially with the first center O1 and protrudes toward the upper arm 15 in the width direction. The bearing portion 12 is disposed in the upper arm 15 while including a play which accepts the eccentricity of the internal gear 11 and the external gear 16. The bearing portion 12 is inserted with a first lever 21 (i.e., serving as a lever) which is positioned overlappingly with the upper arm 15 at an opposite side from a side where the lower arm 10 is overlappingly provided in the width direction. The first lever 21 is made from, for example, metal plate, and is rotatably supported by the lower arm 10 via the bearing portion 12. The first lever 21 is unmovably supported by the lower arm 10 in the axial direction via the bearing portion 12.

The first lever 21 includes a substantially longitudinal connection piece 22 disposed along the upper arm 15 and extending upward shown in FIG. 2A. A distal end of the connection piece 22 protrudes outward relative to an end (upper end) of the lower arm 10. The distal end of the connection piece 22 is provided with a substantially U-shaped engagement groove 22a (i.e., serving as a transmission portion, a recessed portion) recessed toward the first center O1. The recessed amount of the engagement groove 22a toward the first center O1 is set to be larger than an opening width of the engagement groove 22a in a circumferential direction relative to the first center O1. Specifically, the recessed amount of the engagement groove 22a toward the first center O1 is set to be equivalent to a distance which is twice the distance between the first center O1 and the second center O2.

The upper arm 15 is provided with a substantially cylindrical protrusion 17 (i.e., serving as a transmission portion, a protrusion) which has a diameter equivalent to the opening width of the engagement groove 22a and protrudes in the width direction. The protrusion 17 is disposed in the engagement groove 22a and transmits the rotation of the upper arm 15 to the first lever 21 when the upper arm 15 rotates relative to the lower arm 10. Along with the movement of the upper arm 15, the protrusion 17 moves in the radial direction relative to the first center O1 within the range of the recessed amount of the engagement groove 22a. Accordingly, in a case where the upper arm 15 is shifted radially from the lower arm 10 on a straight line which connects the first center O1 and the engagement groove 22a because the internal gear 11 and the external gear 16 are eccentrically meshed with each other, the protrusion 17 moves within the engagement groove 22a to absorb the eccentricity. Each of the protrusion 17 and the engagement groove 22a serves as the transmission portion.

The first lever 21 includes a substantially fan-shaped pressing piece 23 extending forward and downward shown in FIG. 2A. An outer peripheral surface of the pressing piece 23 is provided outward relative to an end (lower end) of the upper arm 15. The outer peripheral surface of the pressing piece 23 extends in the circumferential direction relative to the first center O1 and includes a holding surface 23a (i.e., serving as a release portion). A pressing surface 23b is positioned at a side surface which corresponds to a surface of the pressing piece 23, the surface which precedes in the anti-clockwise direction relative to the first center O1. The pressing surface 23b extends in the radial direction relative to the first center O1.

The lower arm 10 is provided with a bracket 25 which is made from, for example, metal plate. The bracket 25 is fixed to the lower arm 10 below the upper arm 15 and is overlappingly fixed at a side where the first lever 21 is disposed in the width direction. A substantially columnar support pin 26 protrudes from the bracket 25 in the width direction. Accordingly, a second lever 30 and a cable lever 40 are rotatably supported in the sequentially-overlapped manner in the width direction from the side where the first lever 21 is disposed.

The second lever 30 is made from, for example, metal plate and includes a first lever protruding piece 31 and a second lever protruding piece 32 serving as a pair and extending upward and rearward in the radial direction, respectively, relative to the support pin 26 to be formed in a substantially L shape. A distal end of the first lever protruding piece 31 is provided with a substantially columnar engagement pin 33 which protrudes in the width direction. The first lever protruding piece 31 is positioned closer to the lower arm 10 than the pressing piece 23 in the width direction. The first lever protruding piece 31 is positioned off a rotation trajectory of the pressing piece 23 in the anti-clockwise direction relative to the first center O1 in accordance with the forward inclination of the seatback 7, that is, the rotation of the upper arm 15 in the anti-clockwise direction. The engagement pin 33 is disposed on the rotation trajectory of the pressing piece 23 in the anti-clockwise direction relative to the first center O1 in accordance with the forward inclination of the seatback 7. Thus, because the pressing piece 23 rotates in the anti-clockwise direction in accordance with the forward inclination of the seatback 7, the engagement pin 33 is pressed by the pressing piece 23 to rotate the second lever 30 in the clockwise direction. A distal end of the second lever protruding piece 32 is provided with a substantially columnar pressing pin 34 which protrudes in the width direction.

The cable lever 40 is made from, for example, metal plate and includes a third lever protruding piece 41 and a fourth lever protruding piece 42 serving as a pair and extending rearward and forward in the radial direction, respectively, relative to the support pin 26. A distal end of the third lever protruding piece 41 is provided with a longitudinal hole 43 which extends in a circumferential direction relative to the support pin 26 and which opens in the width direction. The pressing pin 34 of the second lever 30 is disposed in the longitudinal hole 43. Thus, the cable lever 40 rotates in the clockwise direction relative to the support pin 26 because the pressing pin 34 presses an inner wall surface of the longitudinal hole 43 in accordance with the rotation of the second lever 30 in the clockwise direction.

A distal end of the fourth lever protruding piece 42 is connected to a first terminal of a cable 45 which extends from the bracket 25. A second terminal of the cable 45 is connected to the lock member 9. Because the cable 45 is pulled by the fourth lever protruding piece 42 in accordance with the rotation of the cable lever 40 in the clockwise direction, the lock member 9 is operated to allow the movement of the seat 5 in the front-rear direction.

The cable lever 40 is constantly biased by an appropriate biasing member in the anticlockwise direction. The bracket 25 is provided with a stopper piece 27 which protrudes in the width direction to be disposed on the rotation trajectory of the fourth protruding piece 42 in the anti-clockwise direction. Thus, the cable lever 40 is normally held at a predetermined rotary position (hereinafter referred to as an initial position) where the fourth lever protruding piece 42 is in contact with the stopper piece 27 by the biasing force of the biasing member. At this time, because the cable 45 is not pulled by the fourth lever protruding piece 42, the lock member 9 restricts the movement of the seat 5 in the front-rear direction.

The second lever 30 is constantly biased by an appropriate biasing member in the clockwise direction with a biasing force smaller than the biasing force applied to the cable lever 40. Thus, the second lever 30 is normally held at a predetermined rotational position (hereinafter referred to as an initial position) where the pressing pin 34 presses the inner wall surface of the longitudinal hole 43, the inner wall surface that precedes in the clockwise direction by the biasing force of the biasing member. At this time, because the second lever 30 is positioned away from the stopper piece 27, the second lever 30 does not interfere with the stopper piece 27.

Next, effects and advantages attained by the first embodiment will be explained. As shown in FIG. 2A, the seatback 7 is in an occupied state and the pressing piece 23 of the first lever 21 is disposed away from the engagement pin 33 of the second lever 30. At this time, the second lever 30 and the cable lever 40 are held at the respective initial positions. The lock member 9 restricts the movement of the seat 5 in the front-rear direction. The upper arm 15 is shifted radially away from the lower arm 10 on the straight line which connects the first center O1 and the engagement groove 22a. That is, the external gear 16 of the upper arm 15 meshes with the internal gear 11 in a state where the second center O2 of the external gear 16 of the upper arm 15 is shifted radially away from the lower arm 10 on the straight line which connects the first center O1 and the engagement groove 22a.

In such a state, when the cam shaft rotates to have the seatback 7 inclined forward, the seatback 7 rotates (is inclined forward) relative to the seat cushion 6 in response to the rotation of the upper arm 15 relative to the lower arm 10. Then, because the protrusion 17 presses the inner wall surface of the engagement groove 22a, the first lever 21 rotates in the anti-clockwise direction relative to the first center O1. Along with that, because the pressing surface 23b of the pressing piece 23 reaches the engagement pin 33 of the second lever 30 and pushes the engagement pin 33, the second lever 30 rotates in the clockwise direction relative to the support pin 26. Because the pressing pin 34 presses the inner wall surface of the longitudinal hole 43, the cable lever 40 rotates in the clockwise direction relative to the support pin 26. Along with that, the fourth lever protruding piece 42 pulls the cable 45 to operate the lock member 9 to allow the movement of the seat 5 in the front-rear direction.

When the seatback 7 is inclined forward, the pressing surface 23b of the pressing piece 23 presses the engagement pin 33 so that the engagement pin 33 slides in an outer circumferential direction. That is, the engagement pin 33 rotates in the clockwise direction in response to the rotation of the first lever 21 in the anti-clockwise direction. The lock member 9 which is connected to the cable 45 is set to allow the movement of the seat 5 in the front-rear direction no later than the time when an outer circumferential end of the pressing surface 23b, or an outer end of the pressure surface 23b in the radial direction reaches the engagement pin 33. In a case where the engagement pin 33 slides on the pressing surface 23b and reaches the holding surface 23a when the seatback 7 is further inclined forward, the engagement pin 33 slides on the holding surface 23a in the circumferential direction and is held thereby. Accordingly, the second lever 30 is held at the rotational position and the lock member 9 holds the seat 5 to be in the allowed state of the movement of the seat 5 in the front-rear direction.

Figure 2B:
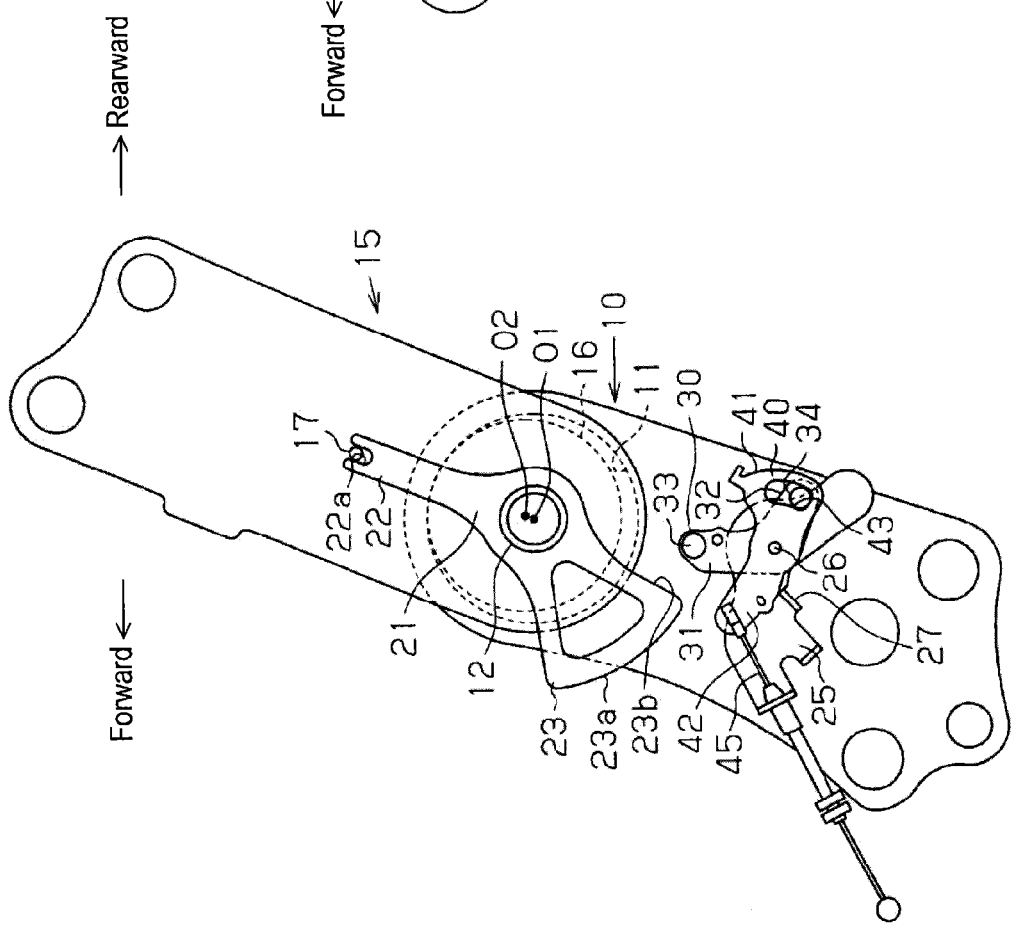
FIG. 2B is a side view of the seat apparatus in a case where the seat is in the forward-inclined state according to the first embodiment.

As shown in FIG. 2B, when the engagement pin 33 reaches an end of the holding surface 23a in response to the further forward inclination of the seatback 7, the forward inclination of the seatback 7 is completed. At this time, the lock member 9 still holds the allowed state of the movement of the seat 5 in the front-rear direction. Further, the upper arm 15 is shifted radially closer to the lower arm 10 on the straight line which connects the first center O1 and the engagement groove 22a. That is, the external gear 16 of the upper arm 15 meshes with the internal gear 11 in a state where the second center O2 of the external gear 16 is shifted closer to the lower arm 10 on the straight line which connects the first center O1 and the engagement groove 22a.

As shown in FIGS. 2A and 2B which illustrate before and after the change of the posture of the seatback 7 by the forward inclination, respectively, the protrusion 17 in FIG. 2A is disposed at a different position from the protrusion 17 in FIG. 2B within the engagement groove 22a. However, in FIGS. 2A and 2B, the second center O2 of the external gear 16 is disposed on the straight line which connects the first center O1 and the engagement groove 22a. The rotational position (inclination angle) of the upper arm 15 relative to the lower arm 10 corresponds to the rotational position (inclination angle) of the first lever 21 relative to the lower arm 10.

As above, when the upper arm 15 revolves while the internal gear 11 and the external gear 16 are held in the meshed state, the eccentricity of the internal gear 11 and the external gear 16 is absorbed by a space or a clearance between the protrusion 17 and the engagement groove 22a and the rotation of the upper arm 15 is transmitted to the first lever 21 as long as the second center O2 is disposed on the straight line which connects the first center O1 and the engagement groove 22a. Even if the second center O2 is not disposed on the straight line which connects the first center O1 and the engagement groove 22a, the eccentricity of the internal gear 11 and the external gear 16 is absorbed at least by a distance between the first center O1 and the second center O2 in the straight line direction by an application of the space or the clearance between the protrusion 17 and the engagement groove 22a. Accordingly, the rotation of the upper arm 15 is securely transmitted to the first lever 21.

As described above, the first lever 21 is rotatably connected to the lower arm 10 fixed to the seat cushion 6 and is linked with the lock member 9 which is supported at the seat cushion 6. Thus, despite the eccentricity of the upper arm 15 (the external gear 16) relative to the lower arm 10 (the internal gear 11), the cable 45 is further stably pulled by the fourth lever protruding piece 42 in accordance with, for example, the rotation of the first lever 21. Accordingly, the lock member 9 further stably allows the movement of the seat 5.

As shown in FIG. 2B. when the upper arm 15 is rotated to have the seatback 7 further inclined forward in a state where the forward inclination of the seatback 7 is completed, the holding surface 23a of the first lever 21 which rotates in accordance with the rotation of the upper arm 15 passes through the engagement pin 33 of the second lever 30 to release the second lever 30. At this time, each of the second lever 30 and the cable lever 40 returns to the initial position by being biased by the corresponding biasing member. Then, the lock member 9 restricts the movement of the seat 5 in the front-rear direction. The end of the holding surface 23a or the end of the holding surface 23a in the preceding direction configures a release portion.

That is, as shown in FIG. 1B, in a state where the forward inclination of the seatback 7 is completed, the seat 5 which is in the allowed state of the movement in the front-rear direction moves rearward to be stored in the retracting space S. Then, the movement of the seat 5 is restricted to fix the seat 5 which is stored in the retracting space S. The biasing power of the appropriate biasing member can be applied to move the seat 5 which is in the allowed state of the movement in the front-rear direction rearward. Alternatively, the seat 5 can be pulled with, for example, a rope by an application of the change of the posture of the seat 5 in accordance with the forward inclination of the seatback 7. Alternatively, the seat 5 can be pulled manually.

As described above, according to the first embodiment, following effects and advantages may be attained.

According to the aforementioned first embodiment, the rotation of the upper arm 15 corresponding to, or in accordance with the forward inclination of the seatback 7 is transmitted to the first lever 21 while the eccentricity of the internal gear 11 and the external gear 16 is absorbed by the engagement groove 22a and the protrusion 17. Then, the lock member 9 which is linked with the first lever 21 is operated to allow the movement of the seat 5. As such, the lock member 9 which is supported at the seat cushion 6 further securely allows the movement of the seat 5 because the lock member 9 is linked with the first lever 21 which is disposed coaxially with the internal gear 11 of the lower arm 10 being fixed to the seat cushion 6 and is rotatably linked with the lower arm 10.

According to the aforementioned first embodiment, the first lever 21 rotates in response to the rotation of the upper arm 15 which corresponds to, or in accordance with the forward inclination of the seatback 7. Accordingly, the lock member 9 is operated to allow the movement of the seat 5 in response to the rotation of the second lever 30. When the holding surface 23a of the first lever 21 passes through the engagement pin 33 of the second lever 30, that is, when the rotary amount of the first lever 21 exceeds a predetermined amount, the second lever 30 is released from the first lever 21 (the holding surface 23a). Thus, the lock member 9 is operated to restrict the movement of the seat 5.

According to the aforementioned first embodiment, the protrusion 17 and the engagement groove 22a are easily configured to absorb the eccentricity of the internal gear 11 and the external gear 16. The aforementioned first embodiment can be modified as follows.

Figure 3A:
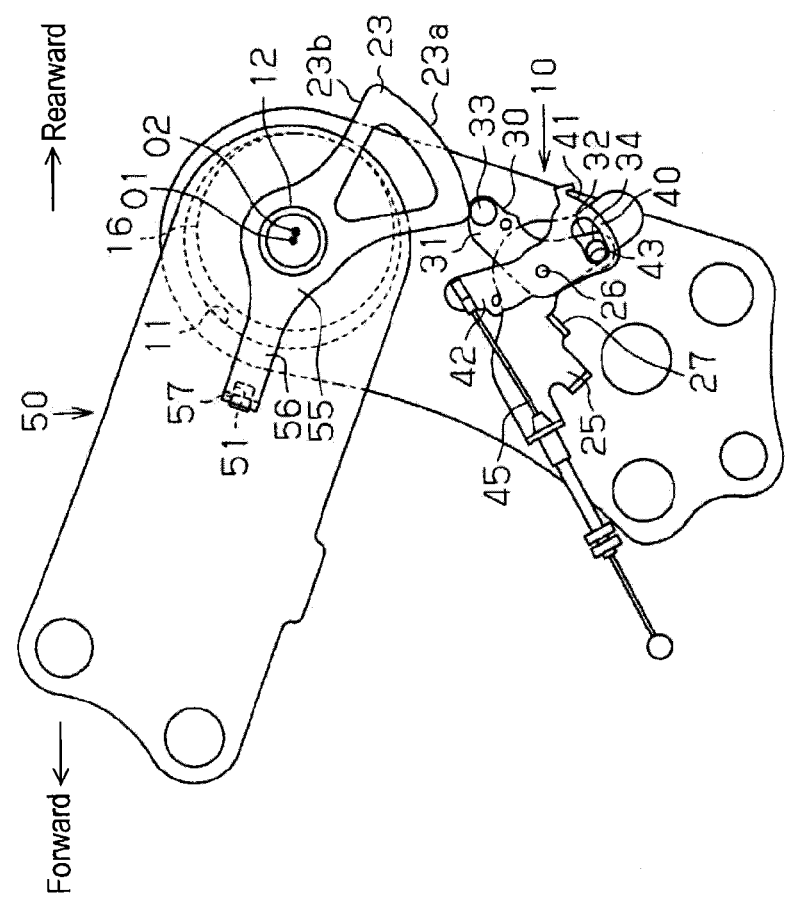
FIG. 3A is a side view of a seat apparatus in a case where the seat is in the occupied state according to the second embodiment.
Figure 3B:
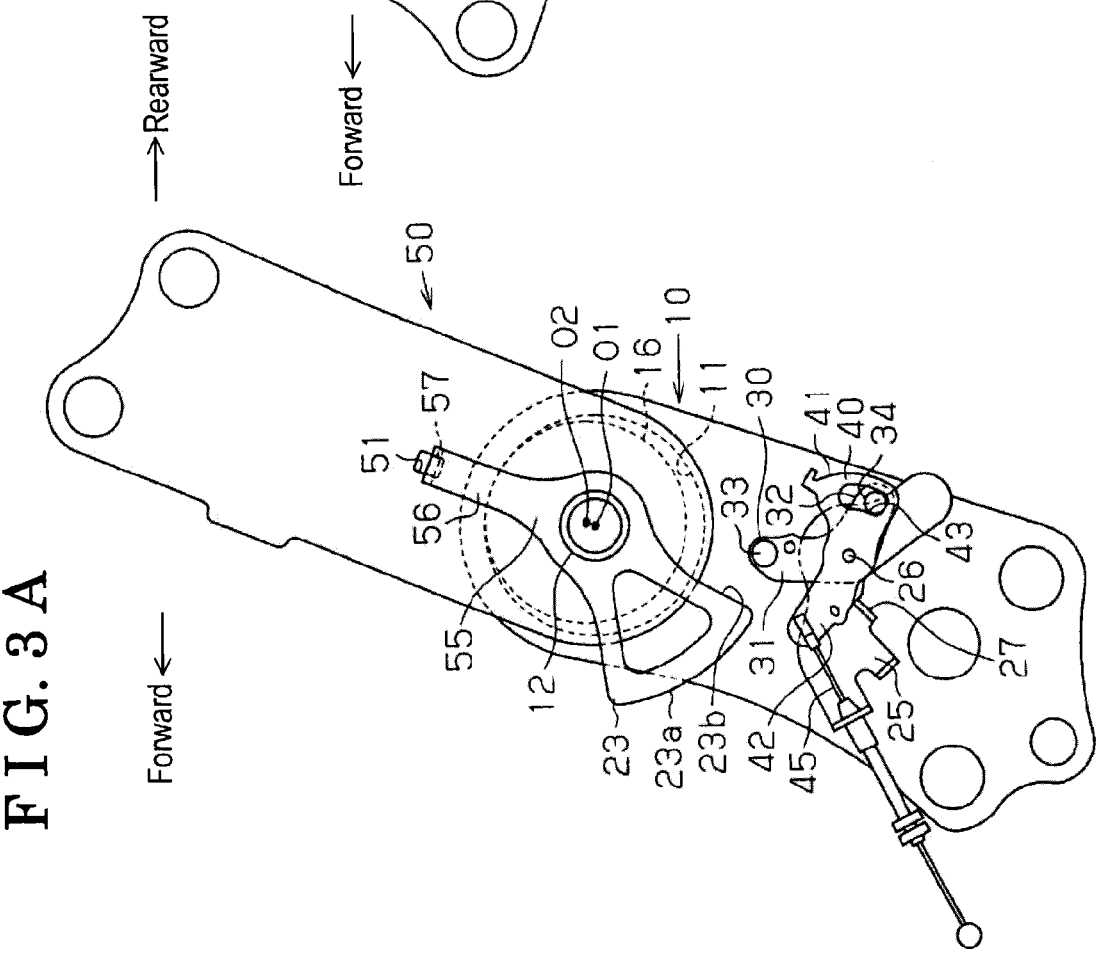
FIG. 3B is a side view of the seat apparatus in a case where the seat is in the forward-inclined state according to the second embodiment.

The positional relationship of the upper arm 15 and the first lever 21 can be replaced with each other. The positional relationship of the protrusion 17 and the engagement groove 22a can be replaced with each other. That is, as shown in FIGS. 3A and 3B, an upper arm 50 of the second embodiment, which corresponds to the upper arm 15 in the first embodiment, includes a substantially longitudinal engagement hole 51 (i.e., serving as a transmission portion, a recessed portion). The engagement hole 51 extends in the radial direction relative to the second center O2 and penetrates the upper arm 50 in the width direction. The engagement hole 51 is disposed outward relative to the end (upper end) of the lower arm 10. Alternatively, the engagement hole 51 may be a recessed portion recessed in the width direction without penetrating the upper arm 50.

A connection piece 56 of a first lever 55 (i.e., serving as a lever) of the second embodiment, which corresponds to the connection piece 22 of the first lever 21 in the first embodiment, includes a distal end which is provided with a substantially pawl-shaped protrusion 57 (i.e., serving as a transmission portion, a protrusion). The protrusion 57 protrudes in the width direction toward the upper arm 50 and is inserted into and positioned in the engagement hole 51. Accordingly, when the upper arm 50 rotates relative to the lower arm 10, the rotation of the upper arm 50 is transmitted to the first lever 55 via the protrusion 57. The protrusion 57 moves in the radial direction relative to the second center O2 within the range of the opening width of the engagement hole 51 in the extending direction (the radial direction).

Thus, in a case where the lower arm 10 is shifted radially from the upper arm 50 on a straight line which connects the second center O2 and the engagement hole 51 because the internal gear 11 and the external gear 16 eccentrically mesh with each other, the protrusion 57 moves in the engagement hole 51 to absorb the eccentricity of the internal gear 11 and the external gear 16. Each of the engagement hole 51 and the protrusion 57 serves as the transmission portion.

As shown in FIG. 3A, the lower arm 10 is shifted radially away from the upper arm 50 on the straight line which connects the second center O2 and the engagement hole 51 when the seatback 7 is in the occupied state. That is, the internal gear 11 of the lower arm 10 meshes with the external gear 16 of the upper arm 50 in a state where the first center O1 of the internal gear 11 of the lower arm 10 is shifted away from the upper arm 50 on the straight line which connects the second center O2 and the engagement hole 51. As shown in FIG. 3B, in a case where the forward inclination of the seatback 7 is completed, the lower arm 10 is shifted radially closer to the lower arm 10 on the straight line which connects the second center O2 and the engagement hole 51. That is, the internal gear 11 of the lower arm 10 meshes with the external gear 16 of the upper arm 50 in a state where the first center O1 of the internal gear 11 of the lower arm 10 is shifted closer to the upper arm 50 on the straight line which connects the second center O2 and the engagement hole 51.

Thus, before and after the forward inclination of the seatback 7, the protrusion 57 in FIG. 3A is disposed at a different position from the protrusion 57 in FIG. 3B within the engagement hole 51. However, in FIGS. 3A and 3B, the first center O1 of the internal gear 11 is disposed on the straight line which connects the second center O2 and the engagement hole 51. The rotational position (the inclination angle) of the upper arm 50 relative to the lower arm 10 corresponds to the rotational position (the inclination angle) of the first lever 55 relative to the lower arm 10. As above, the second embodiment can obtain the similar effects and advantages as those obtained in the first embodiment.

According to the first and second embodiments, the first lever 21, 55 and the lock member 9 are connected desirably. For example, the second lever 30 does not have to be provided.

According to the first and second embodiments, the positional relationship of the lower arm 10 and the upper arm 15, 50 are replaced with each other. The positional relationship of the internal gear 11 and the external gear 16 are replaced with each other.

According to the first and second embodiments, the lower arm 10 (or the upper arm 15, 50) is provided with a separate internal gear. The upper arm 15, 50 (or the lower arm 10) is provided with a separate external gear.

According to the first and second embodiments, the seatback 7 is inclined forward to store the seat 5 in the retracting space S. Alternatively, for example, the seatback 7 is inclined forward to be disposed on the seat cushion 6 to be used as a table.

According to the aforementioned construction, the seat apparatus includes the seat 5, the seat cushion 6 of the seat 5, the seatback 7 of the seat 5, the lower arm 10 being fixed to the seat cushion 6, the lower arm 10 including one of the internal gear 11 and the external gear 16 which includes the teeth fewer than the teeth of the internal gear 11, the external gear 16 eccentrically meshing with the internal gear 11, the upper arm 15, 50 being fixed to the seatback 7, the upper arm 15, 50 including the other of the internal gear 11 and the external gear 16, the lock member 9 being supported at the seat cushion 6, the lock member 9 restricting and allowing the movement of the seat 5, the first lever 21, 55 being coaxially disposed with one of the internal gear 11 and the external gear 16 provided at the lower arm 10, the first lever 21, 55 being rotatably connected to the lower arm 10, the first lever 21, 55 being linked with the operation of the lock member 9 to restrict the movement, and the transmission portion (the protrusion 17, the engagement groove 22a, the engagement hole 51, the protrusion 57) disposed between the lower arm 10 and the upper arm 15, 50, the transmission portion (the protrusion 17, the engagement groove 22a, the engagement hole 51, the protrusion 57) transmitting the rotation of the upper arm 15, 50 which corresponds to the forward inclination of the seatback 7 to the first lever 21, 55 by absorbing the eccentricity of the internal gear 11 and the external gear 16.

According to the aforementioned construction, the rotation of the upper arm 15, 50 corresponding to, or in accordance with the forward inclination of the seatback 7 is transmitted to the first lever 21, 55 while the eccentricity of the internal gear 11 and the external gear 16 is absorbed by the recessed portion (the engagement groove 22a, the engagement hole 51) and the protrusion 17, 57. Then, the lock member 9 which is linked with the first lever 21, 55 is operated to allow the movement of the seat 5. As such, the lock member 9 which is supported at the seat cushion 6 further securely allows the movement of the seat 5 because the lock member 9 is linked with the first lever 21, 55 which is disposed coaxially with the internal gear 11 of the lower arm 10 being fixed to the seat cushion 6 and is rotatably linked with the lower arm 10.

According to the aforementioned construction, the seat apparatus further includes the second lever 30 being rotatably connected to the lower arm 10, the second lever 30 disposed on the rotation trajectory of the rotation of the first lever 21, 55, the rotation corresponding to the forward inclination of the seatback 7, and the release portion (the holding surface 23a) being disposed between the first lever 21, 55 and the second lever 30. The first lever 21, 55 rotates the second lever 30 in accordance with the rotation of the first lever 21, 55 to operate the lock member 9 to allow the movement. The release portion (the holding surface 23a) releases the second lever 30 from the rotation of the first lever 21, 55 in a case where the rotary amount of the rotation of the first lever 21, 55, the rotation corresponding to the forward inclination of the seatback 7 exceeds the predetermined amount.

According to the aforementioned construction, the first lever 21, 55 rotates in response to the rotation of the upper arm 15, 50 which corresponds to, or in accordance with the forward inclination of the seatback 7. Accordingly, the lock member 9 is operated to allow the movement of the seat 5 in response to the rotation of the second lever 30. When the rotary amount of the first lever 21, 55 exceeds the predetermined amount, the second lever 30 is released from the first lever 21, 55 (the holding surface 23a). Thus, the lock member 9 is operated to restrict the movement of the seat 5.

According to the aforementioned construction, the transmission portion (the protrusion 17, the engagement groove 22a, the engagement hole 51, the protrusion 57) includes the protrusion 17, 57 protruding from one of the upper arm 15, 50 and the lever 55 and the recessed portion (the engagement groove 22a, the engagement hole 51) being provided at the other of the upper arm 15, 50 and the first lever 21, 55, the recessed portion (the engagement groove 22a, the engagement hole 51) being inserted with the protrusion 17, 57, the protrusion 17, 57 which is movable, to absorb the eccentricity of the internal gear 11 and the external gear 16.

According to the aforementioned construction, the transmission portion (the protrusion 17, 57, the engagement groove 22a, and the engagement hole 51) is easily constructed with the protrusion 17, 57 and the recessed portion (the engagement groove 22a, the engagement hole 51).

According to this disclosure, the lock member 9 can securely allow the movement of the seat 5 in accordance with the forward inclination of the seatback 7.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus, comprising:
   a seat;
   a seat cushion of the seat;
   a seatback of the seat;
   a lower arm being fixed to the seat cushion, the lower arm including one of an internal gear and an external gear which includes teeth fewer than teeth of the internal gear, the external gear eccentrically meshing with the internal gear, the internal gear having a first center and the external gear having a second center;
   an upper arm being fixed to the seatback, the upper arm including the other of the internal gear and the external gear;
   a lock member being supported at the seat cushion, the lock member restricting and allowing a movement of the seat;
   a lever being coaxially disposed with one of the internal gear and the external gear provided at the lower arm, the lever being rotatably connected to the lower arm, the lever being linked with an operation of the lock member to restrict the movement; and
   a transmission portion disposed between the lower arm and the upper arm, the transmission portion transmitting a rotation of the upper arm which corresponds to a forward inclination of the seatback to the lever by absorbing an eccentricity of the internal gear and the external gear, the transmission portion including a protrusion protruding from the upper arm and including a recessed portion provided at the lever, wherein
   the recessed portion is disposed on a straight line that connects the first center to the second center, and
   a recessed amount of the recess portion toward the first center is set larger than an opening width of the recessed portion in a circumferential direction relative to the first center.

2. The seat apparatus according to claim 1, wherein the lever serves as a first lever;
   the seat apparatus further comprising:
   a second lever being rotatably connected to the lower arm, the second lever disposed on a rotation trajectory of a rotation of the first lever, the rotation corresponding to the forward inclination of the seatback; and
   a release portion being disposed between the first lever and the second lever; wherein
   the first lever rotates the second lever in accordance with the rotation of the first lever to operate the lock member to allow the movement; and
   the release portion releases the second lever from the rotation of the first lever in a case where a rotary amount of the rotation of the first lever, the rotation corresponding to the forward inclination of the seatback exceeds a predetermined amount.

3. A seat apparatus, comprising:
   a seat;
   a seat cushion of the seat;
   a seatback of the seat;
   a lower arm being fixed to the seat cushion, the lower arm including one of an internal gear and an external gear which includes teeth fewer than teeth of the internal gear, the external gear eccentrically meshing with the internal gear, the internal gear having a first center and the external gear having a second center;
   an upper arm being fixed to the seatback, the upper arm including the other of the internal gear and the external gear;
   a lock member being supported at the seat cushion, the lock member restricting and allowing a movement of the seat;
   a lever being coaxially disposed with one of the internal gear and the external gear provided at the lower arm, the lever being rotatably connected to the lower arm, the lever being linked with an operation of the lock member to restrict the movement; and
   a transmission portion disposed between the lower arm and the upper arm, the transmission portion transmitting a rotation of the upper arm which corresponds to a forward inclination of the seatback to the lever by absorbing an eccentricity of the internal gear and the external gear, the transmission portion including a protrusion protruding from the lever and including a recessed portion provided at the upper arm, wherein
   the recessed portion is disposed on a straight line that connects the first center to the second center.

* * * * *